United States Patent
Takeda et al.

(10) Patent No.: US 11,394,443 B2
(45) Date of Patent: Jul. 19, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 64 days.

(21) Appl. No.: 16/762,381

(22) PCT Filed: Nov. 10, 2017

(86) PCT No.: PCT/JP2017/040645
§ 371 (c)(1),
(2) Date: May 7, 2020

(87) PCT Pub. No.: WO2019/092859
PCT Pub. Date: May 16, 2019

(65) Prior Publication Data
US 2020/0358504 A1    Nov. 12, 2020

(51) Int. Cl.
*H04B 7/06* (2006.01)
*H04L 1/00* (2006.01)
(Continued)

(52) U.S. Cl.
CPC ......... *H04B 7/0626* (2013.01); *H04L 1/0061* (2013.01); *H04L 5/0044* (2013.01);
(Continued)

(58) Field of Classification Search
CPC ... H04B 7/0626; H04L 1/0061; H04L 5/0044; H04L 5/0055; H04W 24/10; H04W 72/0413; H04W 72/042; H04W 74/0808
See application file for complete search history.

(56) References Cited

U.S. PATENT DOCUMENTS

2011/0242982 A1*  10/2011  Lunttila ............... H04L 5/0091
                                                     370/241
2013/0003788 A1*   1/2013  Marinier ............. H04B 7/0626
                                                     375/219
(Continued)

FOREIGN PATENT DOCUMENTS

EP      3179644 A1    6/2017
WO   2017/135344 A1    8/2017
WO   2017/190273 A1   11/2017

OTHER PUBLICATIONS

International Search Report issued in PCT/JP2017/040645 dated Feb. 6, 2018 (1 page).
(Continued)

*Primary Examiner* — Michael J Moore, Jr.
(74) *Attorney, Agent, or Firm* — Osha Bergman Watanabe & Burton LLP

(57) ABSTRACT

In order to control CSI reporting properly when communication is carried out by applying different configurations than existing LTE systems, a user terminal has a receiving section that receives configuration information for channel state information reporting, and a control section that controls a start of periodic transmission of the channel state information reporting based on the configuration information in response to receipt of a command for activation of the channel state information reporting, and that controls that, when a condition is fulfilled during a period from the start to deactivation of the channel state information reporting, the channel state information reporting is no longer transmitted.

7 Claims, 10 Drawing Sheets

(51) Int. Cl.
*H04L 5/00* (2006.01)
*H04W 24/10* (2009.01)
*H04W 72/04* (2009.01)
*H04W 74/08* (2009.01)

(52) U.S. Cl.
CPC .......... *H04L 5/0055* (2013.01); *H04W 24/10* (2013.01); *H04W 72/042* (2013.01); *H04W 72/0413* (2013.01); *H04W 74/0808* (2013.01)

(56) References Cited

U.S. PATENT DOCUMENTS

| | | | | |
|---|---|---|---|---|
| 2013/0121301 | A1* | 5/2013 | Kim | H04L 5/0057 370/329 |
| 2014/0369294 | A1* | 12/2014 | Seo | H04L 5/001 370/329 |
| 2016/0360437 | A1* | 12/2016 | Larsson | H04L 5/0048 |
| 2018/0035323 | A1* | 2/2018 | Li | H04L 5/0057 |
| 2019/0045369 | A1 | 2/2019 | Harada et al. | |
| 2019/0089436 | A1 | 3/2019 | Wei et al. | |
| 2019/0132109 | A1* | 5/2019 | Zhou | H04L 5/001 |
| 2019/0141677 | A1* | 5/2019 | Harrison | H04L 5/0096 |
| 2019/0273544 | A1* | 9/2019 | Cha | H04L 5/0048 |
| 2020/0067584 | A1* | 2/2020 | Kang | H04B 7/0626 |
| 2020/0068511 | A1 | 2/2020 | Yang et al. | |
| 2020/0112355 | A1* | 4/2020 | Park | H04B 7/0695 |
| 2020/0177254 | A1* | 6/2020 | Lee | H04W 56/0045 |
| 2020/0205088 | A1* | 6/2020 | Yang | H04W 72/12 |
| 2020/0274601 | A1* | 8/2020 | Ku | H04B 7/0632 |
| 2020/0336227 | A1* | 10/2020 | Takeda | H04L 5/005 |
| 2020/0344808 | A1* | 10/2020 | Ku | H04W 4/06 |
| 2020/0358504 | A1* | 11/2020 | Takeda | H04W 72/0413 |
| 2021/0006314 | A1* | 1/2021 | Takeda | H04L 5/0094 |
| 2021/0136611 | A1* | 5/2021 | Tang | H04W 24/10 |
| 2021/0409174 | A1* | 12/2021 | Yum | H04L 25/0202 |

OTHER PUBLICATIONS

Written Opinion of the International Searching Authority issued in PCT/JP2017/040645 dated Feb. 6, 2018 (3 pages).

Ericsson; "Offline session notes CSI reporting (AI 7.2.2.2)"; 3GPP TSG RAN WG1 Meeting 90bis, R1-1719142; Prague, CZ; Oct. 9-13, 2017 (6 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in counterpart European Patent Application No. 17931446.3, dated Jun. 8, 2021 (12 pages).

Ericsson; "On semi-persistent CSI reporting on PUSCH"; 3GPP TSG-RAN WG1 #90bis, R1-1718442; Prague, Czech Republic; Oct. 9-13, 2017 (4 pages).

Huawei, HiSilicon; "Encoding of Type I and Type II CSI parameters"; 3GPP TSG RAN WG1 Meeting #90bis, R1-1718244; Prague, Czech Republic; Oct. 9-13, 2017 (8 pages).

* cited by examiner

USER TERMINAL AND RADIO COMMUNICATION METHOD

TECHNICAL FIELD

The present invention relates to a user terminal ad a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 13," "LTE Rel. 14," "LTE Rel. 15" or later versions) are under study.

In existing LTE systems (for example, LTE Rel. 8 to 13), uplink signals are mapped to appropriate radio resources and transmitted from UE to eNB. Uplink user data is transmitted using an uplink shared channel (PUSCH (Physical Uplink Shared CHannel)). In addition, uplink control information (UCI) is transmitted by using a PUSCH when transmitted together with the uplink user data, or transmitted by using an uplink control channel (PUCCH (Physical Uplink Control CHannel)) when transmitted alone.

Channel state information (CSI) that is included in UCI is information that is based on instantaneous downlink channel states, and may include, for example, a channel quality indicator (CQI), a precoding matrix indicator (PMI), a precoding type indicator (PTI), a rank indicator (RI) and so forth. CSI is reported from UE to eNB either periodically or aperiodically.

In the event periodic CSI (P-CSI) is used, the UE periodically transmits CSI based on the periodicity and/or resources signaled from a radio base station. On the other hand, when aperiodic CSI (A-CSI) is used, the UE transmits CSI in response to a CSI reporting request (also referred to as a "trigger," a "CSI trigger," a "CSI request," etc.) from a radio base station.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Future radio communication systems (for example, LTE Rel. 14, 15 or later versions, 5G, NR, etc.) are under study to control CSI reporting based on different configurations than existing LTE systems (for example, LTE Rel. 13 or earlier versions).

For example, UE is expected to be configured with CSI from a radio base station, and then performs CSI reporting based on CSI activation or deactivation commands from the radio base station. In this way, when CSI reporting is performed differently than in existing LTE systems, it becomes difficult to apply the CSI-reporting control method of existing LTE systems on an as-is basis.

The present invention has been made in view of the above, and it is therefore an object of the present invention to provide a user terminal and a radio communication method, whereby CSI reporting can be controlled properly when communication is carried out using different configurations than existing LTE systems.

Solution to Problem

According to one aspect of the present invention, a user terminal has a receiving section that receives configuration information for channel state information reporting and a control section that controls a start of periodic transmission of the channel state information reporting based on the configuration information in response to receipt of a command for activation of the channel state information reporting, and that controls that, when a condition is fulfilled during a period from the start to deactivation of the channel state information reporting, the channel state information reporting is no longer transmitted.

Advantageous Effects of Invention

According to the present invention, when communication is carried out using different configurations than existing LTE systems, CSI reporting can be controlled properly.

DESCRIPTION OF EMBODIMENTS

Figure 1B:
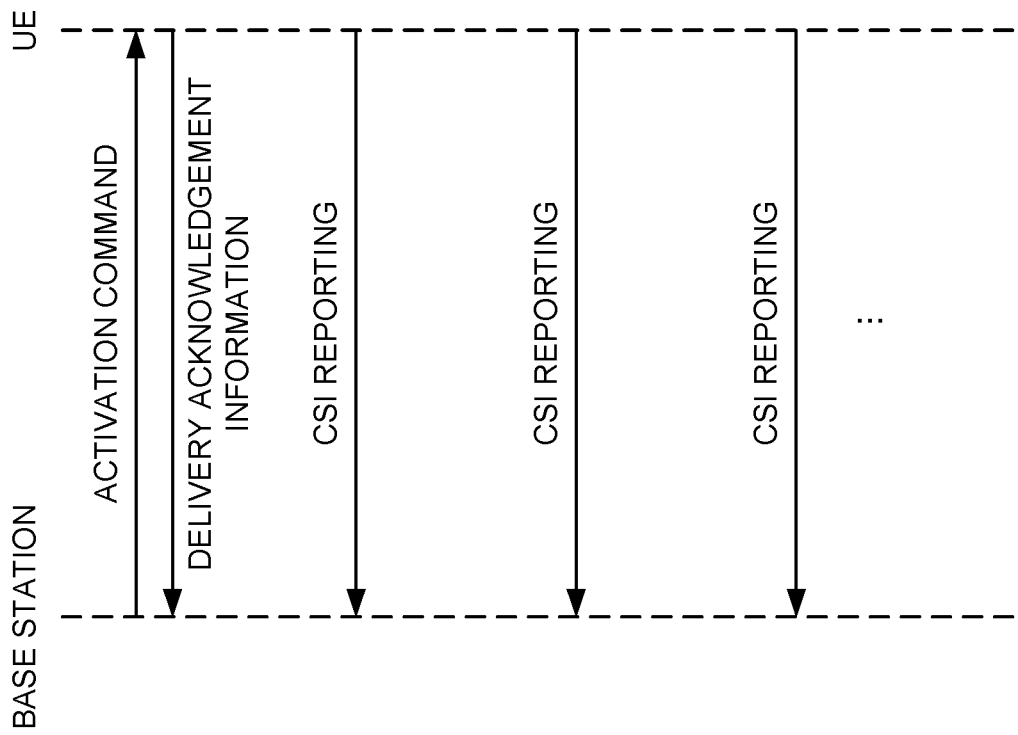
FIGS. 1A and 1B are diagrams to show examples of SP-CSI activation.

In existing LTE systems (Rel. 10 to 13), reference signals for measuring channel states in the downlink are defined.

The reference signals for channel state measurements are also referred to as "CRSs (Cell-specific Reference Signals)" or "CSI-RSs (Channel State Information-Reference Signals)," and are reference signals for use for measuring CSI such as CQIs (Channel Quality Indicators), PMIs (Precoding Matrix Indicators), RIs (Rank Indicators), as channel states.

A user terminal (UE) transmits the results of measurements based on these reference signals for channel state measurements, as feedback of channel state information (CSI), to a radio base station (which may also be a network, an eNB, a gNB, a transmitting/receiving point, etc.), at a given timing. As for the method of CSI feedback, periodic CSI (P-CSI) reporting and aperiodic CSI (A-CSI) reporting are defined.

When the UE reports CSI periodically, the UE transmits P-CSI as feedback in a given periodicity (for example, in a periodicity of five subframes, a periodicity of ten subframe, etc.). Also, if there is no uplink data (for example, PUSCH) to transmit at a given timing (given subframe) for reporting P-CSI, the UE transmits P-CSI by using an uplink control channel (for example, PUCCH).

Also, when CA is used, the UE transmits P-CSI by using an uplink control channel for a given cell (for example, PCell, PUCCH cell, PSCell, etc.). Meanwhile, if there is uplink data to transmit at a given timing, the UE can transmit P-CSI by using an uplink shared channel.

When the UE reports CSI aperiodically, the UE transmits A-CSI in response to CSI triggers (CSI requests) from the radio base station. For example, the UE reports A-CSI at a given timing after a CSI trigger is received (for example, four subframes later).

CSI triggers that are signaled from the radio base station are included in downlink control information (for example, DCI format 0/4) for uplink scheduling grants (UL grants), which is transmitted in a downlink control channel. Following the triggers included in this downlink control information for UL grants, the UE transmits A-CSI by using, for example, an uplink shared channel that is specified by a UL grant. Also, when CA is used, the user terminal can receive a UL grant (including an A-CSI trigger) for a certain cell in a downlink control channel for another cell.

Also, the UE can measure channel stats by using CRSs transmitted in each subframe. In this case, the UE reports the results of measurements (CSI) to the radio base station at a given timing.

Now, envisaging future radio communication systems (also referred to as "5G/NR"), research is underway to report CSI based on different configurations than existing LTE systems. For example, studies are in progress to report CSI by using a number of types of CSI that vary in the type and/or the size of the information that is reported. The types of information reported by using CSI may be referred to as "CSI parameters," "CSI feedback parameters" or "CSI information."

A number of CSI types may be configured depending on the purpose of use (or communication functions). For example, a CSI type (also referred to as "type-1 CSI") to be configured for communication using a single beam and a CSI type (also referred to as "type-2 CSI") to be configured for communication using multiple beams may be defined. Obviously, these purposes of use of CSI types are not limiting.

The UE and the radio base station may use the type-1 CSI to maintain a coarse link using a single beam. Furthermore, the UE and the radio base station may use type-2 CSI to perform connection using multiple beams (for example, multiple layers). For example, the type-2 CSI may be configured to include layer-specific information (or beam-related information such as beam indices).

Also, it may be controlled that only part of the CSI parameters of the type-2 CSI information type (CSI parameters) are subject to reporting. CSI including some information types may be referred to as "partial type-2 CSI."

When transmitting type-1 CSI using an uplink control channel, the UE reports, for example, RIs and/or CRIs (CSI-RS resource indicators), PMIs, and CQIs, as CSI parameters. Note that the PMIs may include a PMI 1, which uses a wideband and which is reported in a long feedback period, and a PMI 2, which uses a subband and which is reported in a short feedback period. Note that PMI 1 is used to select vector W1, PMI 2 is used to select vector W2, and a precoder W is determined based on W1 and W2 (W=W1\*W2).

Also, when the UE transmits partial type-2 CSI by using an uplink control channel, the UE reports, for example, RIs, CQIs, and the numbers of non-zero wideband amplitude coefficients per layer as CSI parameters. The numbers of non-zero wideband amplitude coefficients correspond to beam indices where the amplitude is not scaled to zero. In this case, information about the beams with zero amplitude (or beams with amplitudes that are lower than or equal to a given threshold and that therefore can be considered substantially equal to zero) needs not be transmitted, so that the overhead of PMIs can be reduced by transmitting the numbers of non-zero wideband amplitude coefficients.

Also, future radio communication systems are under study to define a number of CSI reporting periodicities (or reporting timings) and associate every reporting periodicity with at least one of the frequency granularity for reporting, the physical channel to use for CSI reporting, and the codebook (or the CSI type).

For example, when CSI (P-CSI (Periodic CSI)) is reported periodically, a wideband and/or a partial band are used as frequency granularities, a short PUCCH and/or a long PUCCH are used as physical channels, and type 1-CSI is used as the codebook. When CSI is reported periodically, the UE is configured, through higher layer signaling (for example, RRC signaling), with at least one of the reporting periodicity, the PUCCH resource to use and the CSI type.

Also, when CSI (SP-CSI (Semi-persistent CSI)) is reported semi-persistently, at least one of a wideband, a partial band and a subband is used as the frequency granularity, a long PUCCH and/or a PUSCH are used as physical channels, and type-1 CSI and/or partial type-2 CSI are used as codebooks. Partial type-2 CSI may be configured to be transmitted in a long PUCCH. When CSI reporting is carried out semi-persistently, the UE can be configured with partial type-2 CSI and/or the like, by using MAC control information (Media Access Control Control Elements (MAC CEs)). Note that downlink control information other than MAC CEs may be used as well.

Also, when CSI (A-CSI (Aperiodic CSI)) is reported aperiodically, at least one of a wideband, a partial band and a subband is used as the frequency granularity, a PUSCH and/or a short PUCCH are used as physical channels, and type-1 CSI and/or type-2 CSI are used as codebooks. When CSI reporting is carried out aperiodically, the UE can be configured so by using downlink control information.

The size of SP-CSI reporting may be larger than the size of P-CSI reporting. Also, the size of A-CSI reporting may be larger than the size of SP-CSI reporting. Here, "size" means the number of bits to represent the information that is reported, or the payload.

The short PUCCH is equivalent to a UL control channel of a shorter duration than the PUCCH formats for existing LTE systems (for example, LTE Rel. 8 to 13). Also, the long PUCCH is equivalent to a UL control channel that has a longer duration than the short duration of a short PUCCH.

The short PUCCH has a given number of symbols (for example, one or two symbols) at a certain subcarrier spacing (SCS). Furthermore, in the short PUCCH, uplink control information and a reference signal (RS) may be time-division-multiplexed (TDM) or frequency-division-multiplexed (FDM). The RS may be, for example, the demodulation reference signal (DMRS) for use for demodulating the UCI.

The SCS between each symbol of the short PUCCH may be the same as the SCS for the symbols for data channels (hereinafter also referred to as "data symbols"), or may be higher than that. The data channels may include, for example, a downlink data channel, an uplink data channel, and so on. The short PUCCH may be configured in an area including at least the last symbol of each slot.

Meanwhile, the long PUCCH is allocated over a number of symbols in a slot in order to improve the coverage over the short PUCCH and/or to communicate more UCI. For example, the long PUCCH may be comprised of an arbitrary number of symbols from four to fourteen symbols.

In the long PUCCH, UCI and an RS (for example, DMRS) may be time-division-multiplexed (TDM) or frequency-division-multiplexed (FDM). Frequency hopping may be applied to the long PUCCH per given period (for example, per mini-slot (sub-slot)) in a slot. When intra-slot frequency hopping is applied, one or two symbols of DMRS are preferably mapped per hop.

The long PUCCH may be comprised of a number of frequency resources equal to the short PUCCH, or may be comprised of fewer frequency resources (for example, one or two physical resource blocks (PRBs)) than the short PUCCH, in order to achieve power boost effect. Furthermore, the long PUCCH may be allocated in the same slot as the short PUCCH.

With SP-CSI, activation and/or deactivation needs to be executed. Studies are underway so that, once SP-CSI is activated, the UE performs CSI measurements and/or reporting periodically, until the SP-CSI is deactivated.

However, the details of how to control SP-CSI reporting are not determined yet. For example, whether it is allowed not to transmit SP-CSI reporting in active SP-CSI is not decided yet. So, the present inventors have worked on how to control SP-CSI reporting in a state in which SP-CSI is activated, and arrived at the present invention.

Now, embodiments of the present invention will be described in detail below with reference to the accompanying drawings. Note that the configurations according to the herein-contained embodiments may be used individually or may be used in combinations.

Upon receiving an indication of SP-CSI activation (for example, an activation command), the UE may activate SP-CSI. Also, when SP-CSI is activated and then the condition for deactivation is fulfilled later, the UE may deactivate the SP-CSI. Deactivation may be referred to as "release."

The condition for deactivation may be at least one of the condition that the UE receives an indication of SP-CSI deactivation (for example, a deactivation command), and the condition that a given time passes (a timer expires) after SP-CSI is activated.

The activation of SP-CSI might mean providing a state in which the UE uses CSI-RS resources that are configured, providing a state in which the UE transmits SP-CSI reporting periodically, or providing both of these states. The activation of SP-CSI might mean providing a state in which the UE does not use CSI-RS resources that are configured for measurement, providing a state in which the UE does not transmit SP-CSI reporting periodically, or providing both of these states.

First Example

In the first example, skipping SP-CSI reporting is not allowed. An event in which periodic SP-CSI reporting is not transmitted when SP-CSI is activated and then a specific condition is fulfilled later, is referred to as a "skip."

When SP-CSI is activated, the UE reports SP-CSI reporting periodically. SP-CSI reporting is configured based on a combination of higher layer signaling (for example, RRC signaling) and L1 (for example, DCI) or L2 signaling (for example, MAC CEs).

For example, higher layer signaling signals multiple configurations of SP-CSI (for example, at least one of the CSI process, the CSI type, the CSI reporting mode, the CSI component, the CSI-RS resource, the CSI reporting resource, the CSI reporting timing, etc.), and L1 signaling shows one of the multiple configurations.

Furthermore, activation or deactivation of SP-CSI may be commanded using L1 signaling (for example, DCI) or L2 signaling (for example, a MAC CE).

Figure 1A:
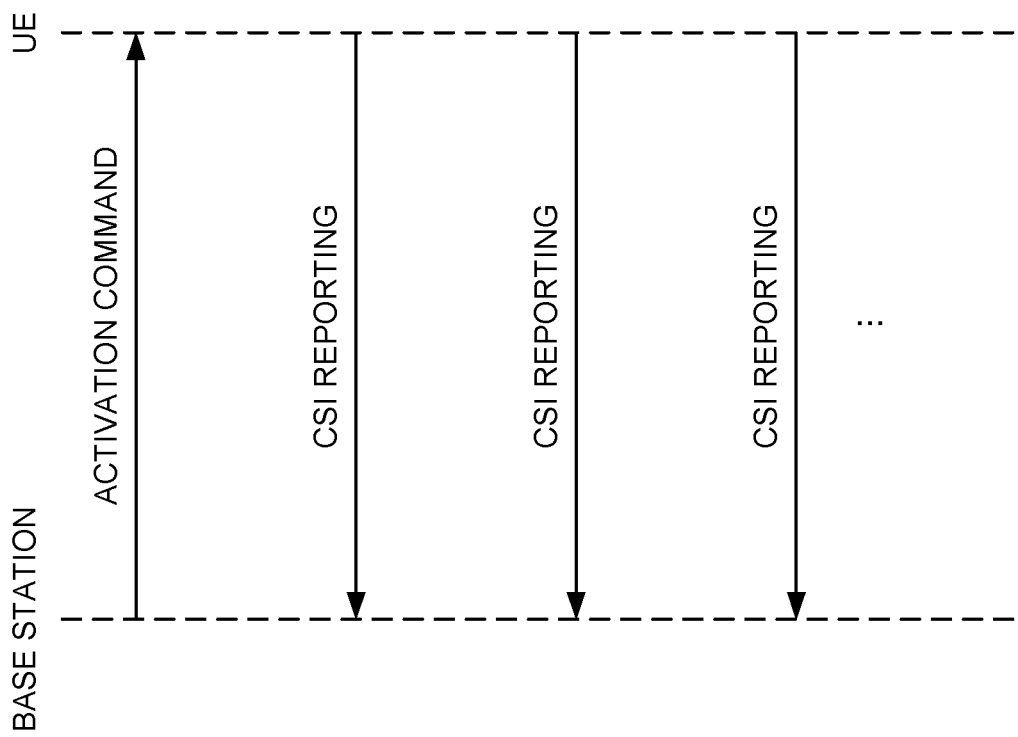

As shown in FIG. 1A, the UE does not have to transmit explicit delivery acknowledgment information in response to activation or deactivation. For example, if activation or deactivation is based on DCI, the UE does not have to transmit explicit delivery acknowledgment information in response to the activation or the deactivation. In this case, a radio base station may identify whether the UE has successfully received the indication for activation or deactivation by detecting whether or not SP-CSI reporting is present. In other words, SP-CSI reporting itself may be regarded as being an ACK. If no SP-CSI reporting is received in the SP-CSI reporting resource that is configured, the base station can judge that the UE has not successfully received the activation. In this case, the overhead of delivery acknowledgment information-related indication can be reduced.

As shown in FIG. 1B, the UE may transmit explicit delivery acknowledgment information in response to activation or deactivation. In this case, the radio base station can check whether the UE has successfully received activation or deactivation, so that subsequent scheduling can be controlled properly.

Note that, if activation or deactivation is DCI to schedule a DL data channel (DL DCI), the UE may transmit delivery acknowledgment information in response to the DCI by using the PUCCH resource indicated by that DCI. That is, the UE may make delivery acknowledgment depending on whether or not there is an HARQ-ACK in response to the DL data channel scheduled by that DCI. In addition, if activation or deactivation is DCI to schedule a UL data channel (UL DCI), the UE may transmit delivery acknowledgment information in response to the DCI in the MAC CE to use the PUSCH resource indicated by that DCI. That is, a field for reporting application of SP-CSI activation or deactivation can be provided in the MAC CEs of the UL data channel scheduled by that UL DCI.

When activation or deactivation is based on a MAC CE, the UE may report delivery acknowledgment information in response to the activation or the deactivation by using an HARQ-ACK in response to the PDSCH carrying that MAC CE. In this case, existing HARQ-ACK process for the PDSCH is used, so that it is possible to avoid making the process complex.

Note that, when activation or deactivation is based on a MAC CE, the UE does not have to transmit explicit delivery acknowledgment information in response to the activation or the deactivation. In this case, the radio base station may identify whether the UE has successfully received the indication for activation or deactivation by detecting whether or not SP-CSI reporting is present. For example, if the base station measures the received SINR by using the DMRS of the channel carrying SP-CSI reporting or measures the received power of the channel carrying SP-CSI, and the value is below a threshold, the base station can judge that SP-CSI has not been activated successfully. In this case, the base station may transmit the SP-CSI activation signal again, or the base station may determine that the SINR of the terminal is not within a normal range, and request PRACH (Physical Random Access CHannel) transmission, by way of DCI, to check the connection. Likewise, if the base station measures the received SINR by using the DMRS of the channel carrying SP-CSI reporting or measures the received power of the channel carrying SP-CSI reporting, and the value exceeds a threshold, the base station can judge that SP-CSI has not been deactivated successfully. In this case, the base station may transmit the SP-CSI deactivation signal again, or the base station may determine that the SINR of the terminal is not within a normal range, and request PRACH transmission, by way of DCI, to check the connection.

When not skipping SP-CSI reporting, the UE always transmits SP-CSI reporting in response to activation of SP-CSI, so that the radio base station can detect the SP-CSI reporting in configured resources, and learn that the activation has been received successfully. Therefore, delivery acknowledgment information in response to activation needs not be supported. Furthermore, when not skipping SP-CSI reporting, the UE does not transmit SP-CSI reporting in response to activation of SP-CSI, so that the radio base station cannot detect the SP-CSI reporting in configured resources, and learn that the deactivation has been successfully received. Therefore, delivery acknowledgment information in response to deactivation needs not be supported.

Figure 2:
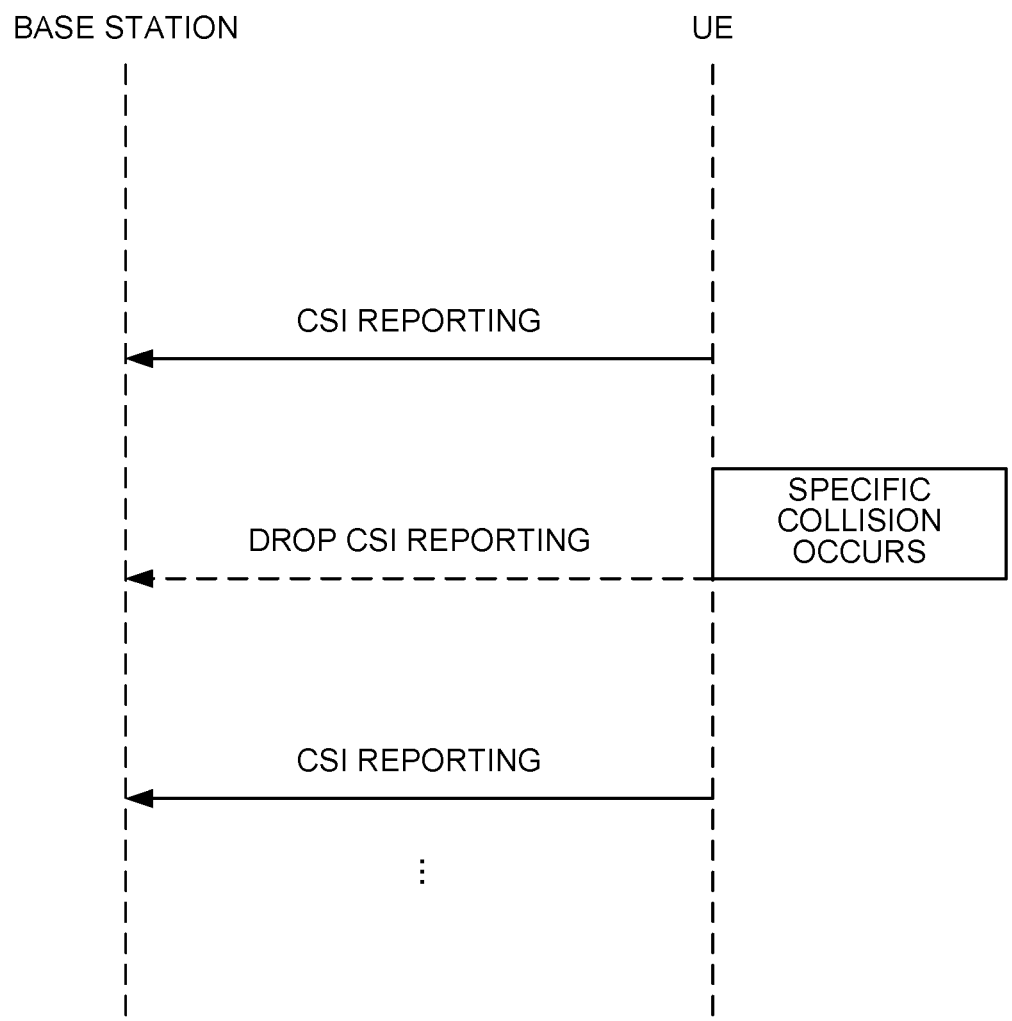
FIG. 2 is a diagram to show an example of dropping CSI reporting.

As shown in FIG. 2, even if skipping is not allowed, when a specific collision occurs in the UE, the UE may drop all or part of the SP-CSI reporting. The condition for this dropping is different from the condition for skipping, which will be described later. The specific collision may refer to an event where an SP-CSI reporting resource that is configured is used for something other than SP-CSI reporting.

The specific collision may be at least one of the following cases 1 to 3.

Case 1: Collision of SP-CSI reporting with other UCIs

If a number of UCIs carrying SP-CSI reporting are concatenated and encoded in the same channel and its coding rate exceeds the maximum coding rate configured for that channel, the UE may drop this SP-CSI reporting. These UCIs may include an HARQ-ACK, include an SR (Scheduling Request), or include CSI for another cell or CSI process.

Case 1 may refer to the case in which the payload (size) of a number of UCIs carrying SP-CSI reporting exceeds a given size.

The rules for judging dropping may be based on the type of CSI, the mode of CSI reporting, and so on. In other words, the UE may judge whether or not to drop CSI reporting based on different rules depending on CSI types, CSI reporting modes, and so forth.

Priorities may be configured per UCI or per SP-CSI reporting. The UE may drop CSI reporting in order from the UCI of the lowest priority, until the coding rate equals or falls below the maximum coding rate. For example, if the priority of SP-CSI reporting is lower than the priority of another UCI, the UE may drop all or part of the SP-CSI reporting.

This drop may be the same as the dropping of P-CSI in the enhanced carrier aggregation (eCA) of LTE Rel. 13. When UE is involved in eCA and a number of CCs' P-CSIs are present in one subframe, the UE selects the P-CSI that is transmitted based on each CC's priority, and drops the other P-CSIs.

According to case 1, the UE can prioritize other UCIs over SP-CSI reporting.

Case 2: Collision Between Given UL Signals and SP-CSI Reporting

When a given UL signal collides with SP-CSI reporting, the UE may drop this SP-CSI reporting. This given UL signal may be, for example, one of a PRACH, message 3 (Msg. 3), and A-CSI.

According to case 2, the UE can prioritize given UL signals over SP-CSI reporting.

Case 3: Collision Between SFI-Based Configuration and SP-CSI Reporting

The UE may have its slot format controlled, dynamically, by slot format-related information (SFI) carried in a group-common PDCCH. If a resource configured for SP-CSI reporting is specified as a DL resource or an unknown resource by the SFI, the UE may drop the SP-CSI reporting in which this resource and the transmission resource overlap.

The SFI shows a slot format of one or more slots. The slot format may indicate at least one of the communication direction, the guard period (GP) and unknown resources per given time in one or more slots (for example, for every given number of symbols or for every given number of slots). The SFI may be included in group-common downlink control information (group common DCI), which is carried in a downlink control channel (group-common PDCCH) that applies in common to a group of one or more user terminals.

Case 3 may also refer to an event in which the resource configured for SP-CSI reporting is configured in a resource that is not an uplink resource, by downlink control information.

According to case 3, it is possible to control slot formats dynamically even when SP-CSI is active.

If dropping SP-CSI reporting is possible, the UE may transmit explicit delivery acknowledgment information in response to activation or deactivation. In this case, the radio base station can check whether the UE has successfully received activation or deactivation, so that subsequent scheduling can be controlled properly. Also, even when the UE drops the first SP-CSI reporting, the UE can still report delivery acknowledgment information.

Second Example

In a second example, skipping SP-CSI reporting is allowed.

Figure 3:
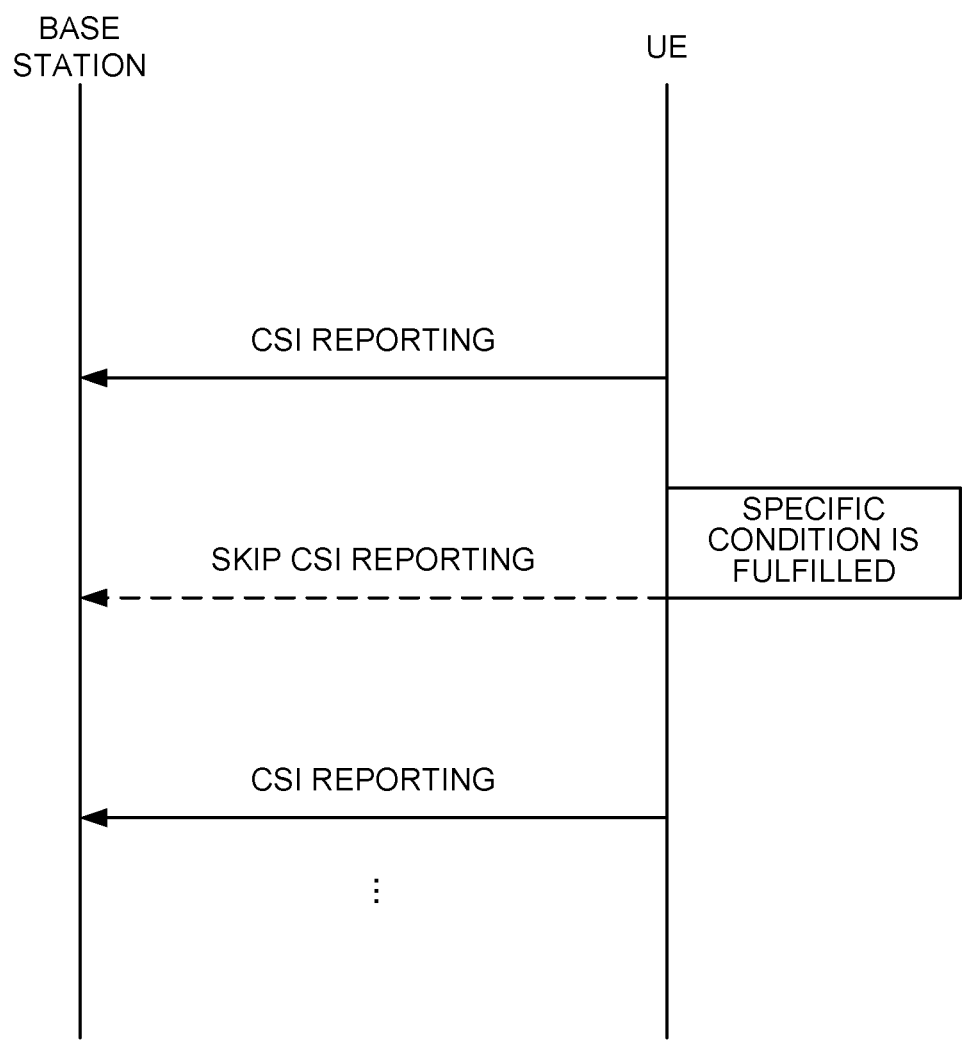
FIG. 3 is a diagram to show an example of skipping CSI reporting.

As shown in FIG. 3, the UE may skip SP-CSI reporting when a specific condition is fulfilled. This specific condition is different from the specific condition that has been described with the first example. Note that skipping may include dropping. Skipping and/or dropping may be referred to by other names, or may be reversed.

If SP-CSI is activated and the specific condition is not fulfilled, the UE transmits SP-CSI reporting periodically. SP-CSI reporting is configured based on the combination of higher layer signaling (for example, RRC signaling) and L1 signaling (for example, DCI) or L2 signaling (for example, MAC CEs).

Note that, like the first example, if a specific collision occurs, the UE may drop the SP-CSI reporting.

The UE does not have to transmit explicit delivery acknowledgment information in response to activation or deactivation. In this case, the radio base station may judge whether the UE has successfully received the indication for activation or deactivation, by detecting whether or not SP-CSI reporting is present. In other words, SP-CSI reporting itself may be regarded as being an ACK. If no SP-CSI reporting is received in the SP-CSI reporting resource that is configured, the base station can judge that the UE has not successfully received the activation. In this case, the overhead of delivery acknowledgment information-related indication can be reduced.

The UE may transmit explicit delivery acknowledgment information in response to the activation or the deactivation. In this case, the radio base station can check whether the UE has successfully received the activation or the deactivation, so that subsequent scheduling can be controlled properly. Also, even when the UE skips or drops the first SP-CSI reporting, the UE can still report delivery acknowledgment information.

The specific condition may be at least one of the following cases 1 to 3.

Case 1: The Case in which the CQI is OOR (Out of Range)

If the UE detects that the CQI is OOR or lower than a certain value, the UE may skip the SP-CSI reporting. By skipping SP-CSI reporting indicating poorer channel quality than given quality, it is possible to reduce the number of SP-CSI reportings, and the UE's power consumption can be reduced.

Case 1 may be that the channel quality measured in SP-CSI is lower than given quality.

If no SP-CSI reporting is detected in the SP-CSI reporting resource that is configured, the base station can learn that the channel quality measured by the UE is poorer than the given quality.

Case 2: the case in which the result of LBT ("Listen Before Talk," "listening," etc.) for unlicensed band UL transmission shows a busy state (LBT busy).

If the busy state is detected before SP-CSI reporting is transmitted, the UE may skip this SP-CSI reporting. Here, the busy state indicates that the radio resource is being used by other systems or radio communication devices. If SP-CSI reporting is carried out while the busy state is detected thus, a number of signals are mapped to the same radio resource, and this may lead to performance degradation of both systems.

According to case 2, it is possible to prevent SP-CSI reporting from colliding with other signals in unlicensed bands.

Case 3: BWP Switching

Figure 4:
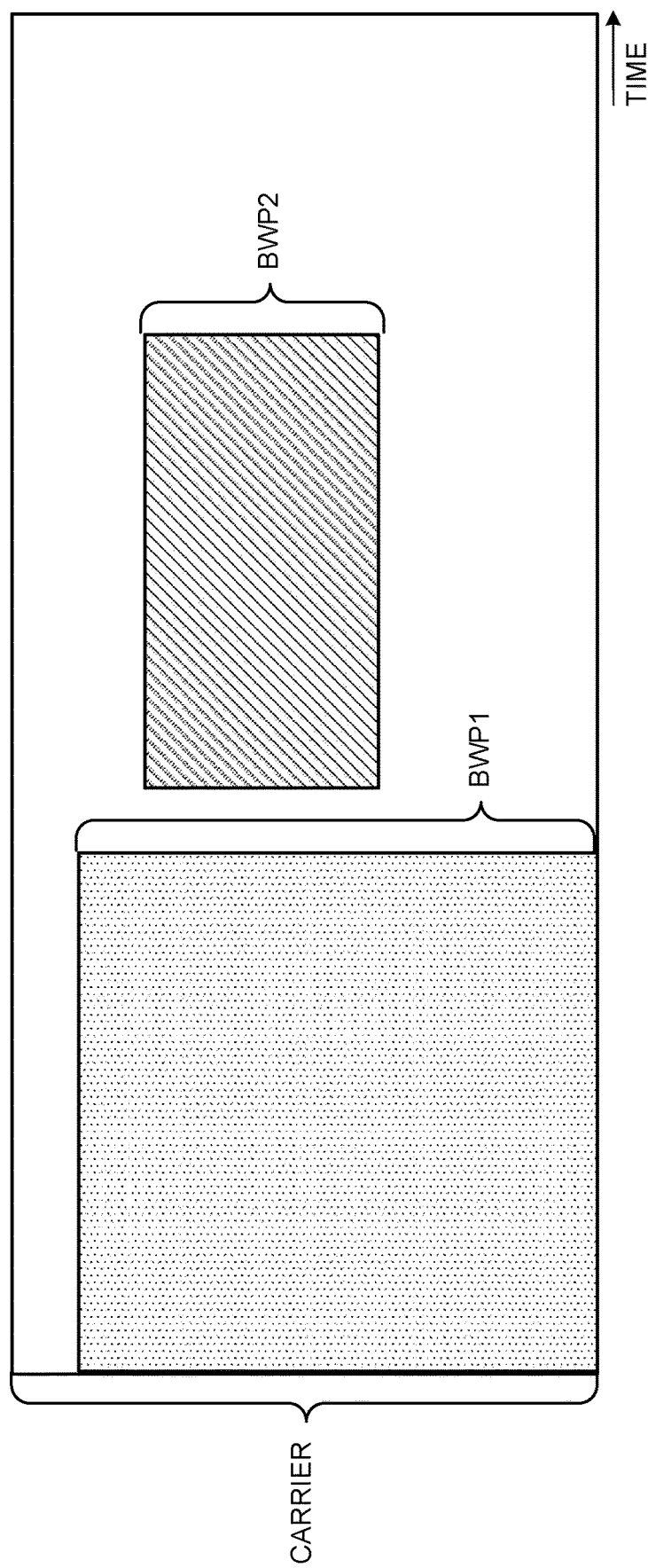
FIG. 4 is a diagram to show an example of switching BWP.

As shown in FIG. 4, one or more partial frequency bands may be configured in a carrier (that is, in a component carrier, or in a system band and/or the like). Each frequency band is referred to as a "partial band" or a "bandwidth part (BWP)." BWP for DL and BWP for UL may be configured.

When the UE's monitoring switches from BWP 1 to another BWP 2, the UE may not be able to transmit SP-CSI reporting on BWP 1. For example, if the SP-CSI resource configured in DL BWP 1 is a wideband and DL BWP 2 is narrower than the frequency band where this SP-CSI resource is configured, the SP-CSI resource can no longer be received, monitored or measured after DL BWP 1 is switched to DL BWP 2. Furthermore, if, for example, the SP-CSI reporting configured in UL BWP 1 uses a wideband and UL BWP 2 is narrower than the frequency band where this SP-CSI reporting is configured, this SP-CSI reporting can no longer be transmitted DL BWP 2. In this case, the SP-CSI reporting is skipped. In this case, the UE may transmit the SP-CSI reporting that is configured in accordance with the configuration of BWP 2, on BWP 2, or the UE does not have to transmit the SP-CSI reporting on BWP 2. Note that the UE may deactivate the SP-CSI on BWP 1 instead of skipping it.

According to case 3, the UE can transmit SP-CSI reporting only if the BWP in which that SP-CSI reporting is configured is activated.

Delivery acknowledgment (acknowledgement) in response to activation or deactivation of SP-CSI will be described, assuming, separately, the case in which SP-CSI reporting is used on PUCCH and the case in which SP-CSI reporting is used on PUSCH.

First, delivery acknowledgment (acknowledgement) in response to activation or deactivation when UE uses SP-CSI reporting on PUCCH will be described.

If activation or deactivation of SP-CSI is based on DCI, the UE does not have to transmit explicit delivery acknowledgment information in response to the activation or the deactivation. In this case, a radio base station may identify whether the UE has successfully received the indication for activation or deactivation by detecting whether or not SP-CSI reporting is present.

Note that, if activation or deactivation is DL DCI, the UE may transmit delivery acknowledgment information in response to the DCI by using the PUCCH resource indicated by that DCI. That is, the UE may make delivery acknowledgment depending on whether or not there is an HARQ-ACK in response to the DL data channel scheduled by that DCI. In addition, if activation or deactivation is UL DCI, the UE may transmit delivery acknowledgment information in response to the DCI in the MAC CE to use the PUSCH resource indicated by that DCI. That is, a field for reporting application of SP-CSI activation or deactivation can be provided in the MAC CEs of the UL data channel scheduled by that UL DCI.

When activation or deactivation of SP-CSI is based on a MAC CE, the UE may report delivery acknowledgment information in response to the activation or the deactivation by using an HARQ-ACK in response to the PDSCH carrying that MAC CE.

Note that, when activation or deactivation is based on a MAC CE, the UE does not have to transmit explicit delivery acknowledgment information in response to the activation or the deactivation. In this case, the radio base station may identify whether the UE has successfully received the indication for activation or deactivation by detecting whether or not SP-CSI reporting is present. For example, if the base station measures the received SINR by using the DMRS of the channel carrying SP-CSI reporting or measures the received power of the channel carrying SP-CSI reporting, and the value is below a threshold, the base station can judge that SP-CSI has not been activated successfully. In this case, the base station may transmit the SP-CSI activation signal again, or the base station may determine that the SINR of the terminal is not within a normal range, and request PRACH transmission, by way of DCI, to check the connection.

Likewise, if the base station measures the received SINR by using the DMRS of the channel carrying SP-CSI reporting or measures the received power of the channel carrying SP-CSI, and the value exceeds a threshold, the base station can judge that SP-CSI has not been deactivated successfully. In this case, the base station may transmit the SP-CSI deactivation signal again, or the base station may determine that the SINR of the terminal is not within a normal range, and request PRACH transmission, by way of DCI, to check the connection.

Next, delivery acknowledgment in response to activation or deactivation when UE uses SP-CSI reporting on PUSCH will be described.

If activation or deactivation of SP-CSI is based on DCI, the UE may use a MAC CE as delivery acknowledgment in response to the activation or deactivation. For example, if activation or deactivation is UL DCI, the UE may transmit delivery acknowledgment information in response to the DCI in the MAC CE to use the PUSCH resource indicated by that DCI.

Note that, if activation or deactivation is DL DCI, the UE may transmit delivery acknowledgment information in response to the DCI by using the PUCCH resource indicated by that DCI.

Note that, if activation or deactivation of SP-CSI is based on DCI, the UE does not have to transmit explicit delivery acknowledgment information in response to the activation or the deactivation. In this case, a radio base station may identify whether the UE has successfully received the indication for activation or deactivation by detecting whether or not SP-CSI reporting is present.

When activation or deactivation of SP-CSI is based on a MAC CE, the UE may report delivery acknowledgment information in response to the activation or the deactivation by using an HARQ-ACK in response to the PDSCH carrying that MAC CE.

Note that, when activation or deactivation is based on a MAC CE, the UE does not have to transmit explicit delivery acknowledgment information in response to the activation or the deactivation. In this case, a radio base station may identify whether the UE has successfully received the indication for activation or deactivation by detecting whether or not SP-CSI reporting is present.

When the UE transmits explicit delivery acknowledgment information in response to activation or deactivation, the radio base station can check whether the UE has successfully received the activation or the deactivation, so that subsequent scheduling can be controlled properly. Also, even when the UE skips the first SP-CSI reporting, the UE can still report delivery acknowledgment information.

According to the second example, the process of SP-CSI reporting is the same as the process of SPS (Semi-Persistent) UL data transmission, so that the complexity of processing in the UE and the radio base station can be reduced.

Other Example

SP-CSI reporting may be dropped and/or skipped only when UE encodes the CSI that is carried in the SP-CSI reporting using CRC. In other words, when it is possible to drop and/or skip SP-CSI reporting, the UE may encode the CSI carried in the SP-CSI reporting based on CRC.

Alternatively, SP-CSI reporting may be skipped only when UE encodes the CSI that is carried in the SP-CSI reporting using CRC. In other words, when it is possible to skip SP-CSI reporting, the UE may encode the CSI carried in the SP-CSI reporting based on CRC.

If there is CSI that is encoded based on CRC and CSI that is not encoded co-exist, the radio base station needs to identify whether or not there is CRC by blind-decoding the CSIs, so that the operation of the radio base station becomes complex. When it is possible to skip and/or drop SP-CSI reporting, CSI may be encoded based on CRC, so that the operation of the radio base station can be simplified.

When it is possible to skip and/or drop SP-CSI reporting, CSI may be encoded based on CRC, so that the radio base station can judge whether or not there is SP-CSI reporting using the CRC in the resource configured for SP-CSI reporting. Based on this judgement, the radio base station can reduce the errors of detecting dropped and/or skipped SP-CSI reporting.

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 5:
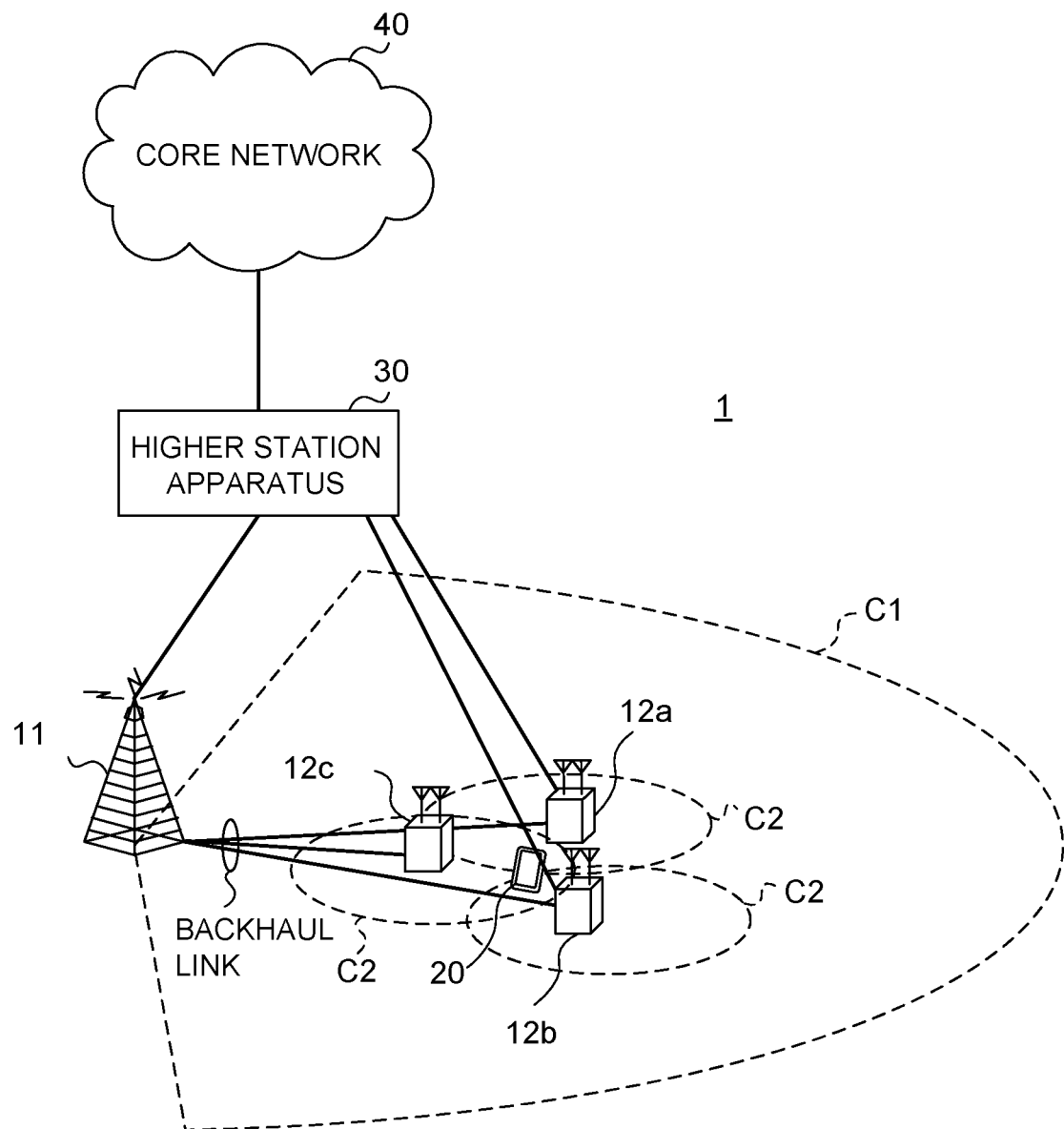
FIG. 5 is a diagram to show an exemplary schematic structure of a radio communication system according to one embodiment of the present invention.

FIG. 5 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and the number of cells and user terminals 20 and so forth are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier," etc.). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

The radio base station 11 and a radio base station 12 (or two radio base stations 12) may be connected with each other by cables (for example, by optical fiber in compliance with the CPRI (Common Public Radio Interface), the X2 interface, and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals that support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands that are each formed with one or contiguous resource blocks, per terminal, and allowing a plurality of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, is communicated by the PDCCH.

Note that scheduling information may be signaled in DCI. For example, the DCI to schedule receipt of DL data may be referred to as "DL assignment," and the DCI to schedule transmission of UL data may also be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data CHannel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 6:
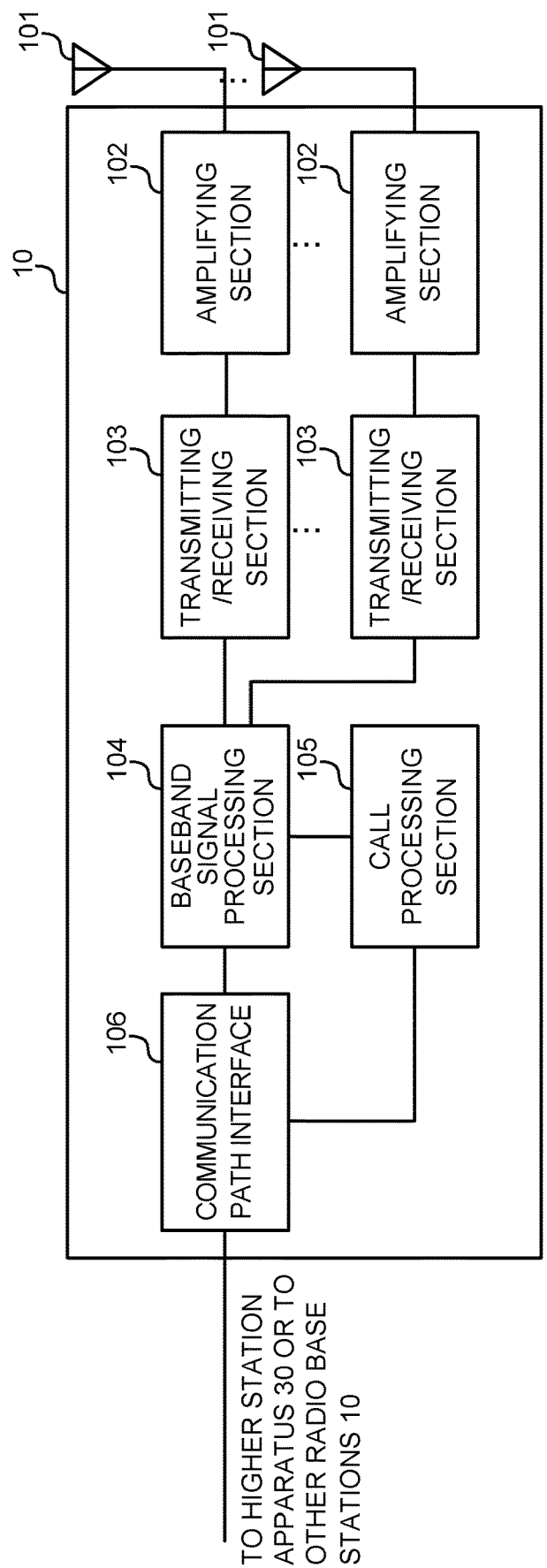
FIG. 6 is a diagram to show an exemplary overall structure of a radio base station according to one embodiment of the present invention.

FIG. 6 is a diagram to show an exemplary overall structure of a radio base station according to one embodiment of the present invention. A radio base station 10 has a plurality of transmitting/receiving antennas 101, amplifying sections 102, transmitting/receiving sections 103, a baseb and signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base station 10, and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Furthermore, the transmitting/receiving sections 103 may transmit the signal (for example, CSI-RS, CRS, etc.) in the reference signal resource (for example, CSI-RS resource) for measuring channel state information (CSI).

Furthermore, the transmitting/receiving sections 103 may transmit the configuration information of SP-CSI reporting.

Furthermore, the transmitting/receiving sections 103 may transmit an activation command and/or a deactivation (release) command for SP-CSI.

Figure 7:
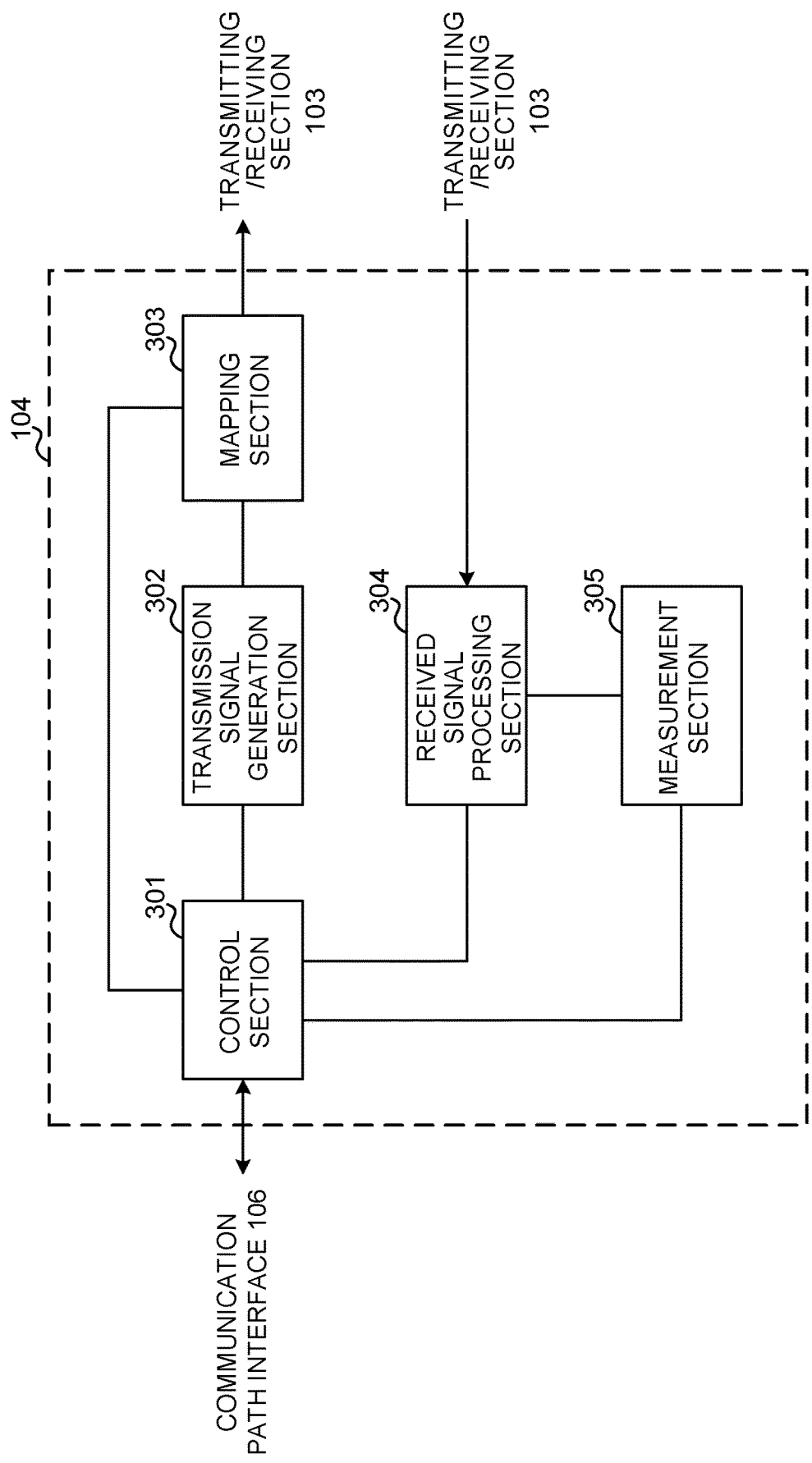
FIG. 7 is a diagram to show an exemplary functional structure of a radio base station according to one embodiment of the present invention.

FIG. 7 is a diagram to show an exemplary functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals in the transmission signal generation section 302, the allocation of signals by the mapping section 303 and so on. Furthermore, the control section 301 controls the signal receiving processes in the received signal processing section 304, the measurement of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals, and so on, based on the results of deciding whether or not retransmission control is necessary for uplink data signals, and so on. Also, the control section 301 controls the scheduling of synchronization signals (for example, PSS (Primary Synchronization Signal)/SSS (Secondary Synchronization Signal)), downlink reference signals (for example, CRS, CSI-RS, DMRS, etc.) and so on.

Furthermore, the control section 301 controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and so forth.

The transmission signal generation section 302 generates downlink signals (downlink control signals, downlink data signals, downlink reference signals, and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which signal downlink data allocation information, and/or UL grants, which signal uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information, acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements, and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the signal strength (for example, RSSI (Received Signal Strength Indicator)), transmission path information (for example, CSI) and so on. The measurement results may be output to the control section 301.

(User Terminal)

Figure 8:
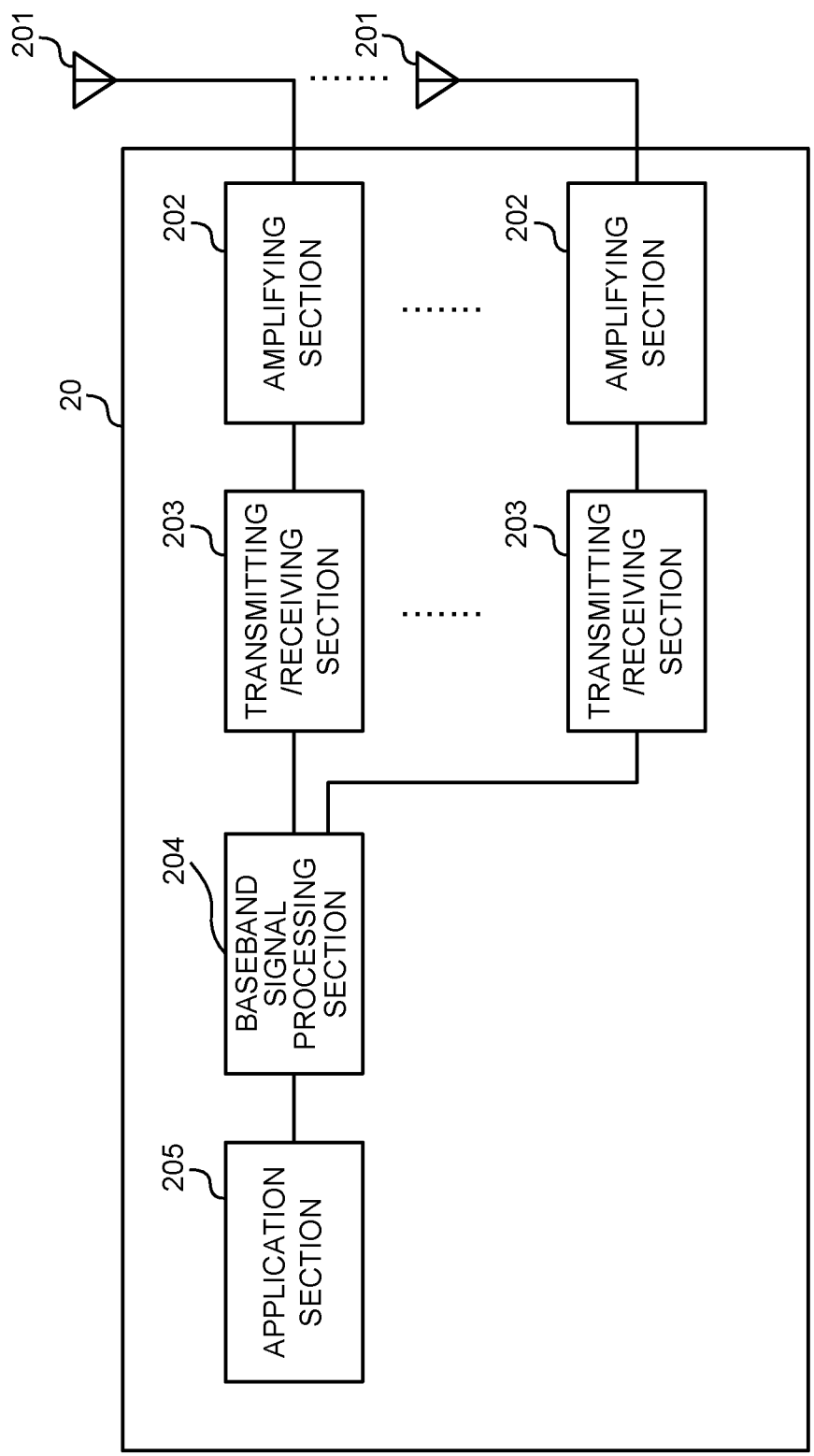
FIG. 8 is a diagram to show an exemplary overall structure of a user terminal according to one embodiment of the present invention.

FIG. 8 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204, and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process, and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 may receive the signal (for example, the CSI-RS) in the reference signal resource (for example, CSI-RS resource) for measuring channel state information (CSI).

Also, the transmitting/receiving sections 203 may receive the configuration information of SP-CSI reporting.

Furthermore, the transmitting/receiving sections 203 may receive an activation (release) command and/or a deactivation command for SP-CSI.

Figure 9:
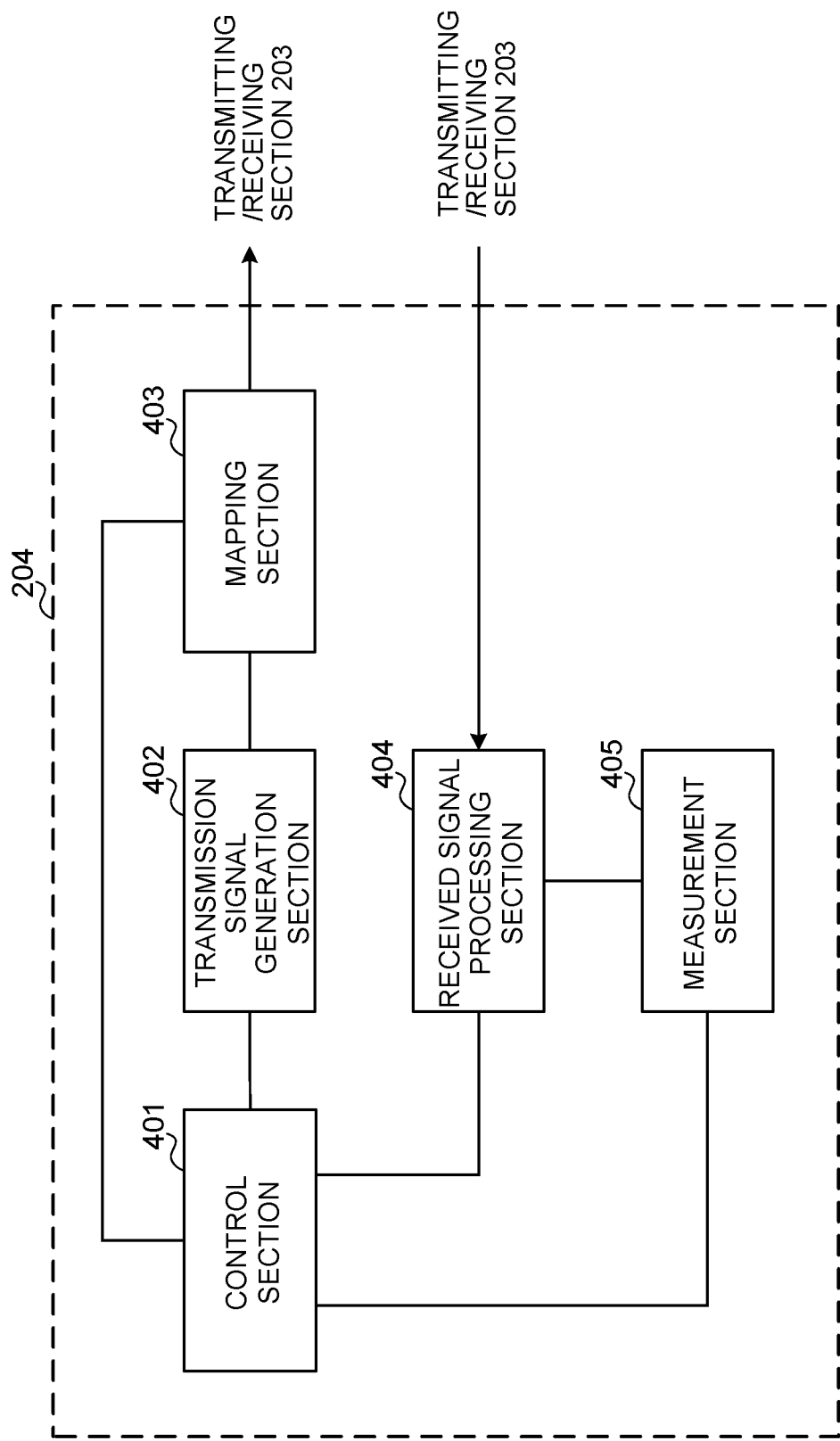
FIG. 9 is a diagram to show an exemplary functional structure of a user terminal according to one embodiment of the present invention.

FIG. 9 is a diagram to show an exemplary functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404, and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurement of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on results of deciding whether or not retransmission control is necessary for the downlink control signals and/or downlink data signals, and so on.

In addition, when various pieces of information signaled from the radio base station 10 are acquired from the received signal processing section 404, the control section 401 may update the parameters used for control based on the information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is signaled from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for received signals that are input from the transmitting/receiving sections 203. Here, the received signals include, for example, downlink signals (downlink control signals, downlink data signals, downlink reference signals, and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, etc.), the signal strength (for example, RSSI), transmission path information (for example, CSI), and so on. The measurement results may be output to the control section 401.

Furthermore, the control section 401 may control the start of periodic transmission of channel state information (for example, SP-CSI) reporting based on the configuration information (for example, higher layer signaling), in response to the receipt of a command (for example, DCI, MAC CE, etc.) for activation of channel state information reporting, and, furthermore, control that, when conditions are fulfilled during the period from the start to the deactivation (release) of the channel state information reporting, the channel state information reporting is no longer transmitted (for example, dropped and/or skipped).

Furthermore, the control section 401 may control the transmission of delivery acknowledgment information in response to the command.

In addition, at least one of the condition that the size of uplink control information, including the channel state information reporting, exceed a given size (for example, case 1 of specific collision), the condition that the channel state information reporting collide with a given uplink signal (for example, case 2 of specific collision), and the condition that the resource configured for the channel state information reporting be configured, by downlink control information, in a resource that is not an uplink resource (for example, case 3 of specific collision) may be used (for example, as the condition for dropping).

In addition, at least one of the condition that the channel quality that is measured be lower than given quality (for example, the specific condition of case 1), the condition that the result of listening show a busy state (for example, the specific condition of case 2), and the condition that the partial band where the channel state information reporting is configured be switched (for example, the specific condition of case 3) may be used (for example, as the condition for skipping).

Also, the control section 401 may encode channel state information reporting based on cyclic redundancy check (CRC).

(Hardware Structure)

Note that the block diagrams that have been used to describe the above embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 10:
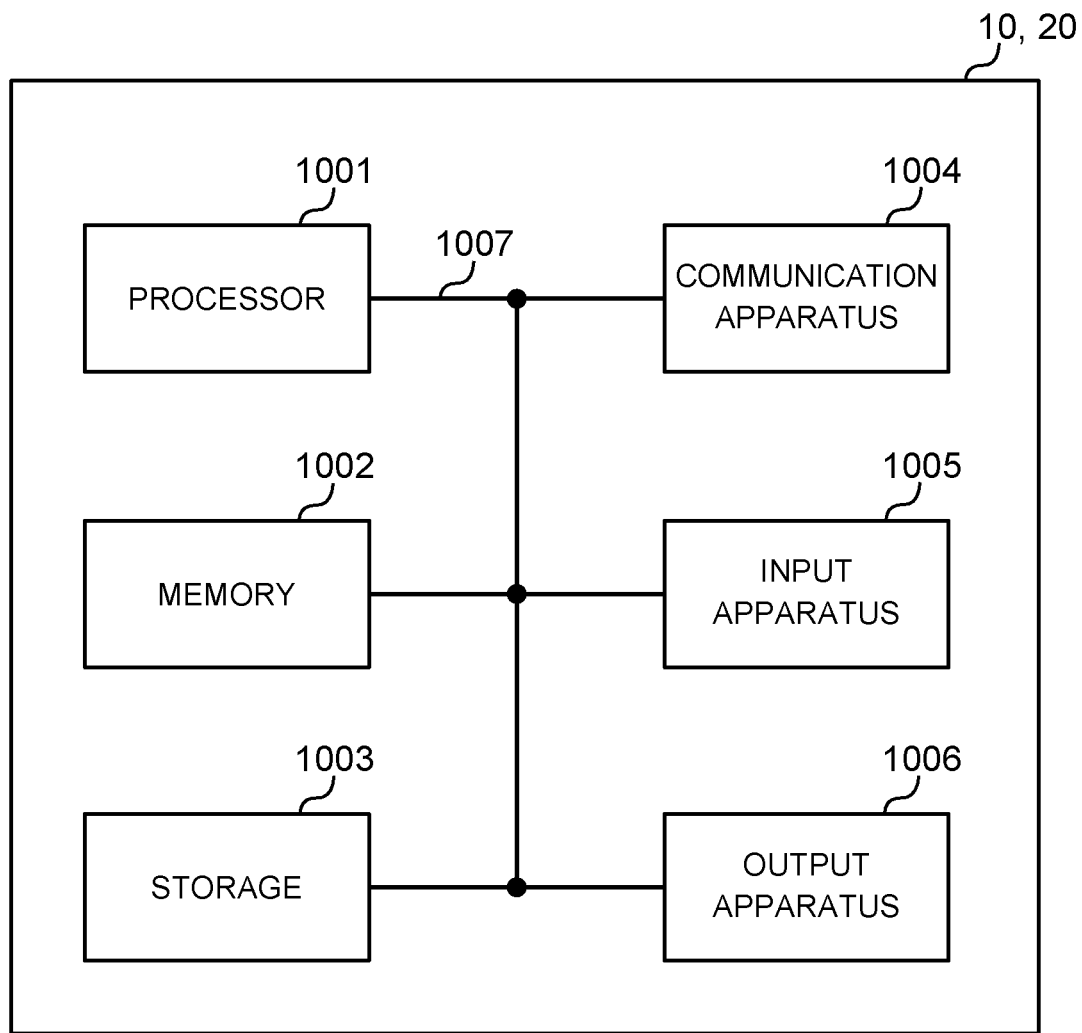
FIG. 10 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 10 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be replaced by "circuit," "device," "unit" and so on. The hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented simultaneously or in sequence, or by using different techniques, on one or more processors. Note that the processor 1001 may be implemented with one or more chips.

The functions of the radio base station 10 and the user terminal 20 are implemented by, for example, allowing hardware such as the processor 1001 and the memory 1002 to read given software (programs), and allowing the processor 1001 to do calculations, control communication that involves the communication apparatus 1004, control the reading and/or writing of data in the memory 1002 and the storage 1003, and so on.

The processor 1001 controls the whole computer by, for example, running an operating system. The processor 1001 may be constituted by a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so forth from the storage 1003 and/or the communication apparatus 1004, into the memory 1002, and executes various processes according to these. As for the programs, programs to allow computers to execute at least part of the operations of the above-described embodiment may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer and so on, in order to implement, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp, and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007, so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a "signal" may be a "message." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency," and so on.

Furthermore, a radio frame may be comprised of one or more periods (frames) in the time domain. One or more periods (frames) that constitute a radio frame may be each referred to as a "subframe." Furthermore, a subframe may be comprised of one or more slots in the time domain. A subframe may be a fixed time duration (for example, 1 ms), which does not depend on numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot, and a symbol all refer to a unit of time in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or minislot may be referred to as a "TTI." That is, a subframe and/or a TTI may be a subframe (1 ms) in existing LTE, may be a shorter duration than 1 ms (for example, one to thirteen symbols), or may be a longer period of time than 1 ms. Note that the unit to represent a TTI may be referred to as a "slot," a "minislot" and so on, instead of a "subframe."

Here, a TTI refers to the minimum time unit for scheduling in radio communication, for example. For example, in LTE systems, a radio base station schedules the radio resources (such as the frequency bandwidth and transmission power each user terminal can use) to allocate to each user terminal in TTI units. Note that the definition of TTIs is not limited to this.

A TTI may be the transmission time unit of channel-encoded data packets (transport blocks), code blocks and/or codewords, or may be the unit of processing in scheduling, link adaptation, and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit for scheduling may be controlled.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "partial TTI" (or a "fractional TTI"), a "shortened subframe," a "short subframe," a "minislot," a "sub-slot," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, minislots, symbols, and so on described above are simply examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the length of symbols, the length of cyclic prefix (CP), and so on can be changed in a variety of ways.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, in a memory), or may be managed in a control table. The information, signals, and so on to be input and/or output can be overwritten, updated, or appended. The information, signals, and so on that are output may be deleted. The information, signals, and so on that are input may be transmitted to other pieces of apparatus.

The method of signaling information is by no means limited to those used in the examples/embodiments described in this specification, and other methods may be used as well. For example, signaling of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as "RRC messages," and can be, for example, an "RRC connection setup message," "RRC connection reconfiguration message," and so on. Also, MAC signaling may be signaled using, for example, MAC control elements (MAC CEs (Control Elements)).

Also, signaling of given information (for example, signaling of information to the effect that "X holds") does not necessarily have to be sent explicitly, and can be sent in an implicit way (for example, by not signaling this piece of information, by signaling another piece of information, and so on).

Decisions may be made in values represented by 1 bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, codes, code segments, program codes, programs, subprograms, software modules, applications, software applications, software packages, routines, subroutines, objects, executable files, execution threads, procedures, functions, and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves, and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell," and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other suitable terms.

Furthermore, the radio base stations in this specification may be interpreted as user terminals. For example, each example/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways), and so on may be possible, but these are not limiting) other than base stations, or combinations of these.

The examples/embodiments illustrated in this specification may be used individually or in combinations, which may be switched depending on the mode of implementation. Also, the order of processes, sequences, flowcharts, and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second," and so on as used herein does not generally limit the number/quantity or order of these elements. These designations are used herein only for convenience, as a method for distinguishing between two or more elements. It follows that reference to the first and second elements does not imply that only two elements may be employed or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing, and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interpreted as "access."

As used herein, when two elements are connected, these elements may be considered "connected" or "coupled" to each other by using one or more electrical wires, cables, and/or printed electrical connections, and, as a number of non-limiting and non-inclusive examples, by using electromagnetic energy having wavelengths of the radio frequency region, the microwave region and/or the optical region (both visible and invisible).

In the present specification, the phrase "A and B are different" may mean "A and B are different from each other." The terms such as "leave," "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives an indication activating a semi-persistent channel state information (CSI) reporting by one of a first downlink control information (DCI) and a medium access control-control element (MAC CE); and
   a processor that performs the activated semi-persistent CSI reporting based on the indication,
   wherein the processor determines whether or not to perform the activated semi-persistent CSI reporting, based on at least one of a second DCI indicating a slot format and a maximum coding rate.

2. The terminal according to claim 1, wherein when the second DCI indicates a period that is not uplink, the processor does not perform the activated semi-persistent CSI reporting in the period.

3. The terminal according to claim 1, wherein the processor determines, based on whether or not a coding rate of an uplink control information including the semi-persistent CSI reporting is higher than the maximum coding rate, whether or not to perform the activated semi-persistent CSI reporting.

4. The terminal according to claim 2, wherein the processor determines, based on whether or not a coding rate of an uplink control information including the semi-persistent CSI reporting is higher than the maximum coding rate, whether or not to perform the activated semi-persistent CSI reporting.

5. A radio communication method for a terminal comprising:
   receiving an indication activating a semi-persistent channel state information (CSI) reporting by one of a first downlink control information (DCI) and a medium access control-control element (MAC CE); and
   performing the activated semi-persistent CSI reporting based on the indication,
   wherein the terminal determines whether or not to perform the activated semi-persistent CSI reporting, based on at least one of a second DCI indicating a slot format and a maximum coding rate.

6. A base station comprising:
   a transmitter that transmits an indication activating a semi-persistent channel state information (CSI) reporting by one of a first downlink control information (DCI) and a medium access control-control element (MAC CE); and
   a processor that acquires the activated semi-persistent CSI reporting based on the indication,
   wherein it is determined whether or not to perform the activated semi-persistent CSI reporting, based on at least one of a second DCI indicating a slot format and a maximum coding rate.

7. A system comprising a terminal and a base station; wherein
   the terminal comprises:
      a receiver that receives an indication activating a semi-persistent channel state information (CSI) reporting by one of a first downlink control information (DCI) and a medium access control-control element (MAC CE); and
      a processor that performs the activated semi-persistent CSI reporting based on the indication,
      wherein the processor determines whether or not to perform the activated semi-persistent CSI reporting, based on at least one of a second DCI indicating a slot format and a maximum coding rate,
   the base station comprises:
      a transmitter that transmits the indication; and
      a processor that acquires the activated semi-persistent CSI reporting based on the indication.

* * * * *